US008627650B2

(12) United States Patent
Sano et al.

(10) Patent No.: US 8,627,650 B2
(45) Date of Patent: *Jan. 14, 2014

(54) EXHAUST GAS PURIFICATION DEVICE AND EXHAUST GAS PURIFICATION METHOD

(75) Inventors: Keisuke Sano, Susono (JP); Takaaki Itou, Mishima (JP); Kimikazu Yoda, Susono (JP); Kazuhiro Wakao, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 219 days.

This patent is subject to a terminal disclaimer.

(21) Appl. No.: 12/867,282

(22) PCT Filed: Feb. 25, 2009

(86) PCT No.: PCT/IB2009/000341
§ 371 (c)(1),
(2), (4) Date: Aug. 12, 2010

(87) PCT Pub. No.: WO2009/109823
PCT Pub. Date: Sep. 11, 2009

(65) Prior Publication Data
US 2010/0319327 A1 Dec. 23, 2010

(30) Foreign Application Priority Data
Mar. 3, 2008 (JP) ................. 2008-051822

(51) Int. Cl.
*F01N 13/08* (2010.01)
*F01N 3/10* (2006.01)
*F01N 9/00* (2006.01)

(52) U.S. Cl.
USPC .............. 60/286; 60/274; 60/285; 60/287; 60/288; 60/297

(58) Field of Classification Search
USPC ............... 60/274, 285, 287, 288, 297
See application file for complete search history.

(56) References Cited

U.S. PATENT DOCUMENTS 5,373,696 A  12/1994  Adamczyk, Jr. et al.
5,979,158 A  11/1999  Kaiser et al.
(Continued)

FOREIGN PATENT DOCUMENTS

EP  1 186 764  3/2002
EP  1 203 878  5/2002
(Continued)

OTHER PUBLICATIONS

International Search Report in International Application No. PCT/IB2009/000341, Mailing Date: Aug. 6, 2009.

(Continued)

*Primary Examiner* — Kenneth Bomberg
*Assistant Examiner* — Brandon Lee
(74) *Attorney, Agent, or Firm* — Finnegan, Henderson, Farabow, Garrett & Dunner, LLP

(57) ABSTRACT

An exhaust gas purification device has: a bypass passage (20) disposed in an exhaust passage (15) of an internal combustion engine (10); an adsorbent (21) which is disposed in the bypass passage (20), and adsorbs unburned components in exhaust gas at a low temperature and desorbs the adsorbed unburned components at a high temperature; and an exhaust gas purification catalyst (22) which is disposed in the exhaust passage (15) at a downstream side of a portion where the bypass passage (20) merges, and purifies unburned components in exhaust gas; and a desorption amount adjustment (19) unit that adjusts the desorption amount of unburned components adsorbed by the adsorbent (21) based on an integrated fuel cut air amount (fgs), which is an integrated value of air amount taken into a combustion chamber of the internal combustion engine (10) during execution of fuel cut.

11 Claims, 8 Drawing Sheets

(56) References Cited

U.S. PATENT DOCUMENTS

| | | |
|---|---|---|
| 6,000,217 A | 12/1999 | Hochmuth |
| 6,018,943 A | 2/2000 | Martin et al. |
| 6,253,547 B1 * | 7/2001 | Watanabe et al. ............... 60/297 |
| 6,378,296 B1 | 4/2002 | Yasui et al. |
| 6,378,298 B2 | 4/2002 | Harima et al. |
| 6,397,586 B1 | 6/2002 | Sakurai et al. |
| 7,243,487 B2 * | 7/2007 | Shouda et al. ................. 60/285 |
| 2002/0007626 A1 * | 1/2002 | Kitajima et al. ............... 60/274 |
| 2002/0053199 A1 | 5/2002 | Sato et al. |
| 2004/0139797 A1 | 7/2004 | Ueno et al. |
| 2004/0237508 A1 | 12/2004 | Yamazaki et al. |
| 2010/0307141 A1 | 12/2010 | Wakao et al. |
| 2010/0319327 A1 | 12/2010 | Sano et al. |

FOREIGN PATENT DOCUMENTS

| | | |
|---|---|---|
| FR | 2 789 730 | 8/2000 |
| JP | 05-231134 | 9/1993 |
| JP | 05-256124 | 10/1993 |
| JP | 6-93829 | 4/1994 |
| JP | 6-93840 | 4/1994 |
| JP | 2000-297630 | 10/2000 |
| JP | 2002-115538 | 4/2002 |
| JP | 2004-068665 | 3/2004 |
| JP | 2006-342700 | 12/2006 |
| JP | 2009-103090 | 5/2009 |
| WO | WO 2009/109823 | 9/2009 |

OTHER PUBLICATIONS

Written Opinion of the International Searching Authority in International Application No. PCT/IB2009/000341, Mailing Date: Aug. 6, 2009.

German Office Action for German Appl. No. 11 2009 000 112.2 dated Jun. 12, 2012.

* cited by examiner

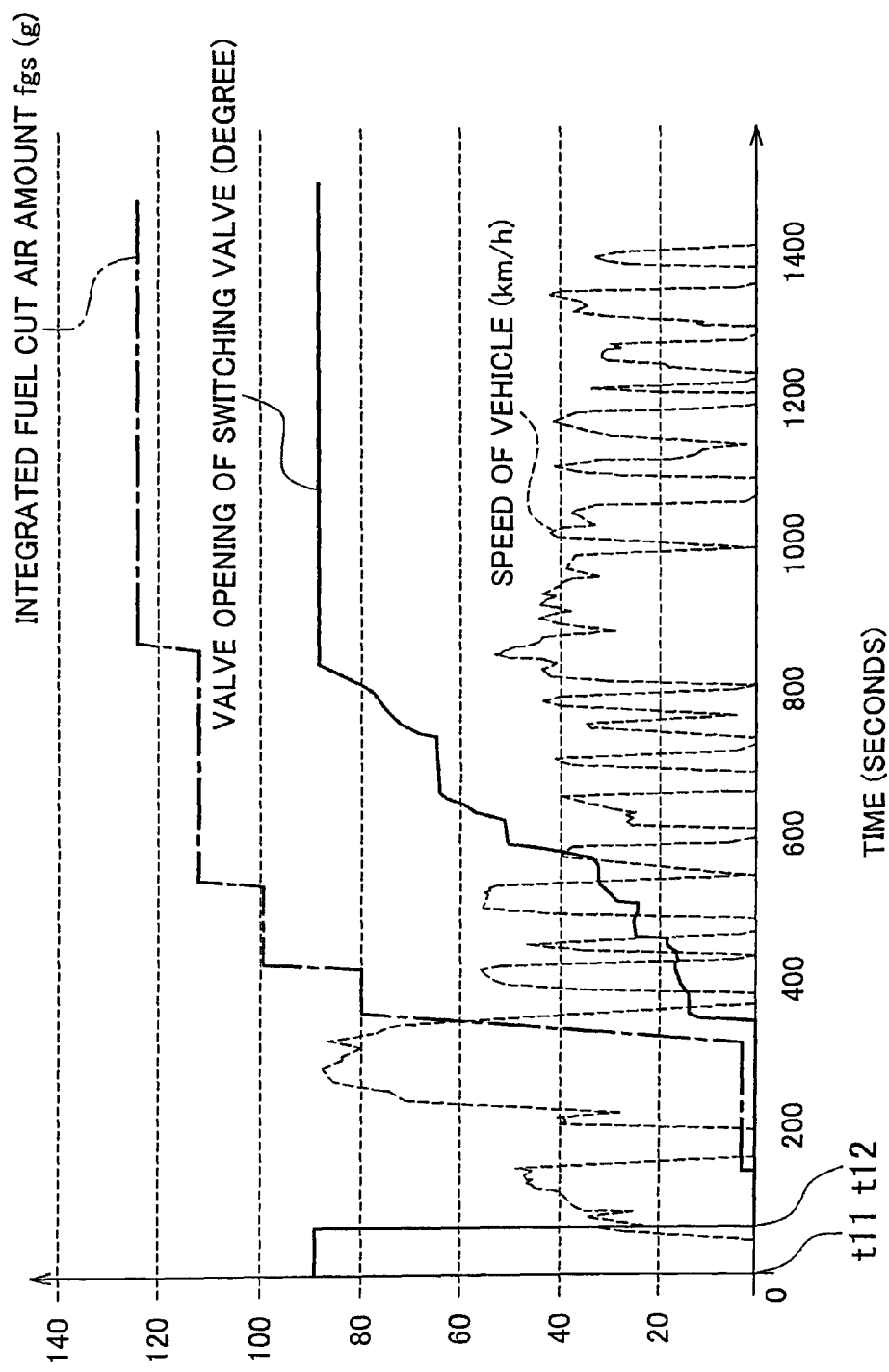

EXHAUST GAS PURIFICATION DEVICE AND EXHAUST GAS PURIFICATION METHOD

CROSS-REFERENCE TO RELATED APPLICATIONS

This application is a national phase application of International Application No. PCT/IB2009/000341, filed Feb. 25, 2009, and claims the priority of Japanese Application No. 2008-051822, filed Mar. 3, 2008, the contents of both of which are incorporated herein by reference.

BACKGROUND OF THE INVENTION

1. Field of the Invention

The present invention relates to an exhaust gas purification device in an internal combustion engine, and more particularly to an exhaust gas purification device for purifying unburned components adsorbed by an adsorbent, and a method thereof.

2. Description of the Related Art

An exhaust gas purification device, which adsorbs unburned components of such exhaust gas as hydrocarbon (HC) by an adsorbent installed in a bypass passage until an exhaust gas purification catalyst is activated after the cold start of an internal combustion engine, for example, and desorbs the unburned components after warming up completes, and purifies the desorbed components using an exhaust gas purification catalyst (three-way catalyst) disposed downstream of the adsorbent, has been proposed. This exhaust gas purification catalyst has an oxygen storage function to store oxygen. In the exhaust gas purification device, an amount of oxygen required to purify the desorbed unburned components must be supplied to the exhaust gas purification catalyst.

Japanese Patent Application Publication No. 6-93840 (JP-A-6-93840) discloses an exhaust gas purification device wherein secondary air introduction means, such as an air injection device, is installed in an exhaust passage in order to supply oxygen to an exhaust gas purification catalyst.

In JP-A-6-93840, however, a secondary air supply device, that is, an additional device, must be provided.

SUMMARY OF THE INVENTION

The present invention provides an exhaust gas purification device and method for appropriately purifying unburned components desorbed from an adsorbent without providing an additional device.

An exhaust gas purification device for an internal combustion engine according to a first aspect of the present invention, has: a bypass passage disposed in an exhaust passage of an internal combustion engine; an adsorbent which is disposed in the bypass passage, and adsorbs unburned components in exhaust gas at a low temperature, and desorbs the adsorbed unburned components at a high temperature; an exhaust gas purification catalyst which is disposed in the exhaust passage at a downstream side of a portion where the bypass passage merges, and purifies the unburned components in exhaust gas; and a desorption amount adjustment unit that adjusts the desorption amount of the unburned components adsorbed by the adsorbent based on an integrated fuel cut air amount, which is an integrated value of the air amount taken into a combustion chamber of the internal combustion engine during execution of the fuel cut.

According to the first aspect, when the temperature of the adsorbent rises by the passing of exhaust gas, unburned components adsorbed by the adsorbent desorb. Also if the integrated fuel cut air amount increases, the oxygen supply amount to the exhaust gas purification catalyst, that is, the amount of unburned components desorbed from the adsorbent which can be purified (oxidized), increases. Therefore, the unburned components desorbed from the adsorbent can be appropriately purified in the exhaust gas purification catalyst by adjusting the desorption amount of the unburned components adsorbed by the adsorbent, according to the integrated fuel cut air amount. Oxygen required for purifying the desorbed unburned components is supplied to the exhaust gas purification catalyst using fuel cut, so it is unnecessary to provide an addition device to inject air separately, such as an air injection device.

In the first aspect, the desorption amount adjustment unit may increase the desorption amount as the integrated fuel cut air amount increases.

In the above aspect, the desorption amount adjustment unit may not increase the desorption amount when determination is made that the unburned components desorbed from the adsorbent have not been purified in the exhaust gas purification catalyst.

Normally unburned components can be appropriately purified in the exhaust gas purification catalyst by adjusting the desorption amount of the unburned components adsorbed by the adsorbent according to the integrated fuel cut air amount. However, the oxygen supply amount to the exhaust gas purification catalyst that is assumed based on the integrated fuel cut air amount may not be sufficiently secured to purify the unburned components desorbed from the adsorbent. In such a case, the desorbed unburned components are discharged without being purified by the exhaust gas purification catalyst. To prevent this, adjustment is performed so that the amount of the desorbed unburned component is suppressed, that is, the desorption amount not increased.

In the above aspects, the desorption amount adjustment unit may decrease the desorption amount when determination is made that a state is established where the internal combustion engine discharges a large amount of exhaust gas to the exhaust passage.

In the above aspect, a vehicle that includes the exhaust gas purification device may allow the vehicle may be driving by at least one of the internal combustion engine and an electric motor, and the internal combustion engine may be driven by the electric motor, and the fuel cut may be performed, based on a relationship between the integrated fuel cut air amount and an integrated air amount, which is an integrated value of the air amount taken into the combustion chamber.

If an operation state where a fuel cut, which is performed according to the operation state of the vehicle, such as the case of deceleration, is not performed, continues, and the speed of increase of the oxygen amount to be supplied to the exhaust gags purification catalyst, which is assumed based on the value of the integrated fuel cut air amount, is not faster than the speed of increase of the integrated air amount, the stored oxygen amount which is sufficient for purifying the desorbed unburned components is not secured, so the desorption amount cannot be high. Therefore the unburned components desorbed from the adsorbent cannot be quickly purified. In such a case, the fuel cut is forcibly executed using an electric motor, so that the integrated fuel cut air amount is quickly increased, that is, the oxygen amount to be supplied to the exhaust gas purification catalyst is quickly increased. Thereby purification can be executed even if the desorption amount of the unburned components is increased, and as a result completion of desorption can be quickened.

In the case of when the load on the internal combustion engine is high and the rotation speed is high, for example, if a large amount of exhaust gas is discharge from the internal combustion engine to the exhaust passage, a large amount of exhaust gas flows into the adsorbent, and the temperature of the adsorbent rises rapidly. If the temperature rises rapidly, adsorbed unburned components, of which amount is too much to be purified by the exhaust gas purification catalyst, may be desorbed. Therefore in such a state, the desorption amount adjustment unit decreases the desorption amount, and improves the robustness of the desorption control.

An exhaust gas purification device according to a second aspect of the present invention, has: a bypass passage disposed in an exhaust passage of an internal combustion engine; an adsorbent which is disposed in the bypass passage, and adsorbs unburned components in exhaust gas at a low temperature, and desorbs the adsorbed unburned components at a high temperature; an exhaust gas purification catalyst which is disposed in the exhaust passage at a downstream side of a portion where the bypass passage merges, and purifies unburned components in exhaust gas; a switching valve that switches a passage of a part or all of the exhaust gas or air discharged from the internal combustion engine, from the exhaust passage to the bypass passage; and an electronic control unit that controls an opening of the switching valve based on an integrated fuel cut air amount, which is an integrated value of air amount taken into a combustion chamber of the internal combustion engine during execution of fuel cut.

The exhaust gas purification device of the second aspect may further have an air flow meter disposed in an intake passage of the internal combustion engine. The integrated fuel cut air amount may be a value generated by performing time integration on the intake air amount during fuel cut.

In the above aspect, the electronic control unit may increase the opening of the switching valve as the integrated fuel cut air amount increases.

In the above aspect, the exhaust gas purification device may further have an exhaust gas sensor that detects unburned components in exhaust gas discharged from the exhaust gas purification catalyst. The control unit may not increase the opening of the switching valve when determination is made that the unburned components desorbed from the adsorbent have not been purified in the purification catalyst based on the information from the exhaust gas sensor.

In the above aspect, the exhaust gas purification device may further have a temperature sensor that measures the temperature of the adsorbent. The electronic control unit may set the opening of the switching valve to 0 degrees when the temperature of the adsorbent based on the temperature sensor exceeds a temperature threshold, that is, a temperature at which unburned components adsorbed by the adsorbent are desorbed.

In the above aspect, the electronic control unit may set the opening of the switching valve to 0 degrees when determination is made that a state is established where the internal combustion engine discharges a large amount of exhaust gas to the exhaust passage.

In the above aspect, the electronic control unit may set the opening of the switching valve to 0 degrees when the internal combustion engine has high load and high rotation, and may set the opening of the switching valve to the opening set before controlling to 0 degrees when the internal combustion engine has low load and low rotation.

In the above aspect, a vehicle that includes the exhaust gas purification device may allow the vehicle may be driving by at least one of the internal combustion engine and an electric motor, and the internal combustion engine may be driven by the electric motor. The electronic control unit may drive the internal combustion engine by a rotation force of the electric motor and perform fuel cut, based on a relationship between the integrated fuel cut air amount and an integrated air amount, which is an integrated value of air amount taken into the combustion chamber.

In the above aspect, when the integrated fuel cut air amount is smaller than a first reference value, the internal combustion engine may be driven by a rotation force of the electric motor and the air amount for a difference between a second reference value and the integrated fuel cut air amount may be taken into the combustion chamber.

An exhaust gas purification method according to a third aspect of the present invention is an exhaust gas purification method for an exhaust gas purification device having a bypass passage disposed in an exhaust passage of an internal combustion engine, an adsorbent which is disposed in the bypass passage, and adsorbs unburned components in exhaust gas at a low temperature and desorbs the adsorbed unburned components at a high temperature, and an exhaust gas purification catalyst which is disposed in the exhaust passage at a downstream side of a portion where the bypass passage merges, and purifies unburned components in exhaust gas. The exhaust gas purification method adjusts the amount of exhaust gas or air which flows into the adsorbent based on an integrated fuel cut air amount, which is an integrated value of air amount taken into a combustion chamber of the internal combustion engine during execution of fuel cut.

In the above aspect, the amount of exhaust gas or air that flows into the adsorbent may be increased as the integrated fuel cut air amount increases. The amount of exhaust gas or air that flows into the adsorbent may not be changed when the unburned components desorbed from the adsorbent have not been purified in the exhaust gas purification catalyst. The exhaust gas or air may not be allows to flow into the adsorbent when the temperature of the adsorbent exceeds a temperature threshold, which is a temperature at which unburned components adsorbed by the adsorbent are desorbed.

In the above aspect, when the integrated fuel cut air amount is smaller than a first reference value, the internal combustion engine may be driven by a rotation force of an electric motor, and a forced-fuel cut may be performed by taking the air amount for a difference between a second reference value and the integrated fuel air amount into the combustion chamber.

In the above aspect, the flow of the exhaust gas or air into the adsorbent may be stopped when the internal combustion engine has high load and high rotation, and the flow of the exhaust gas or air to the adsorbent may be set to a flow rate set before the stopping of the flow if the internal combustion engine has low load and low rotation.

According to the above aspect, an exhaust gas purification device for appropriately purifying unburned components desorbed from an adsorbent can be provided without requiring an additional device.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 8 is a graph of an experiment example showing a time-based relationship of the fuel cut integrated air amount, opening of the switching valve and speed of the vehicle in the purge control, according to the embodiment.

DETAILED DESCRIPTION OF EMBODIMENTS

Figure 1:
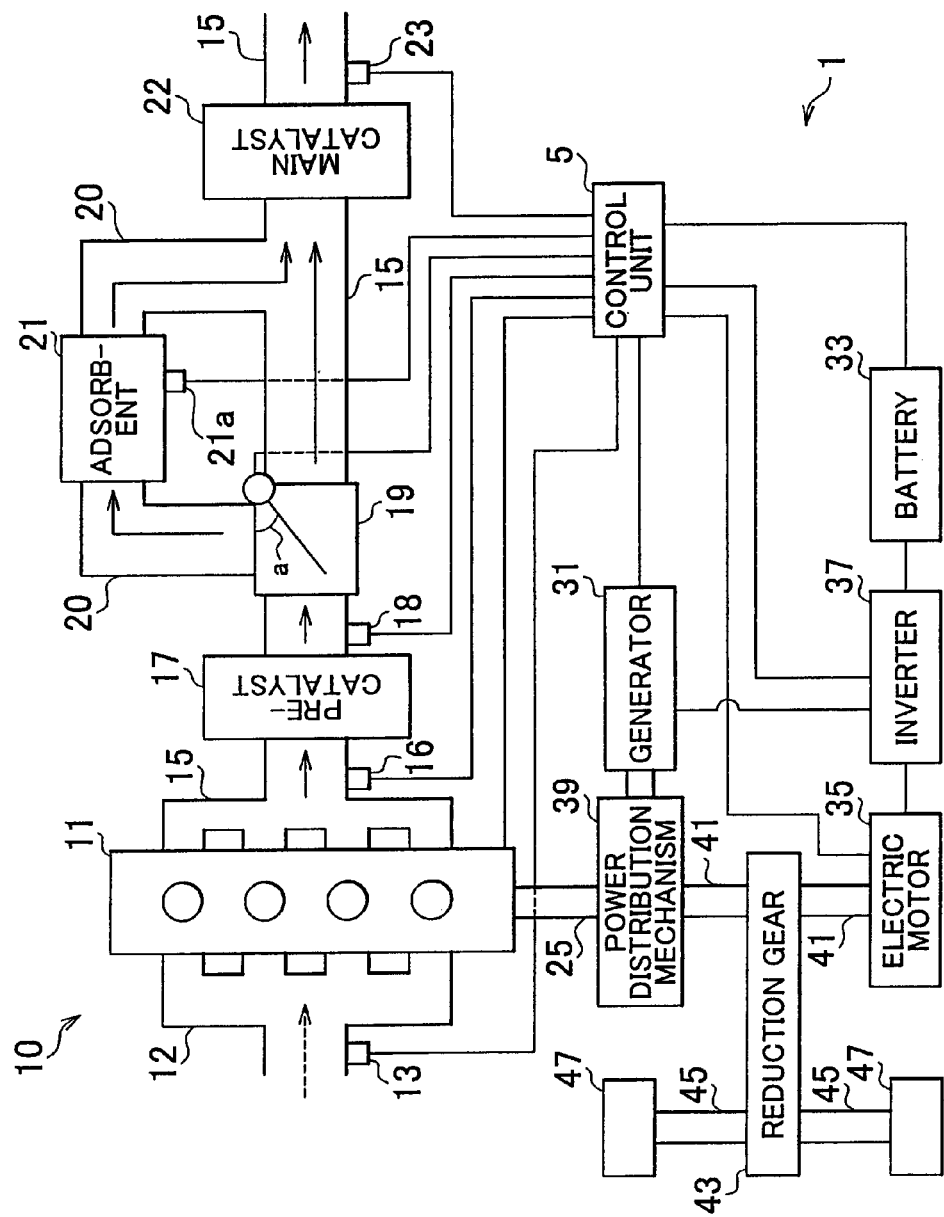
FIG. 1 is a block diagram of a vehicle according to an embodiment of the present invention.

Example embodiments of the invention will be described below with reference to FIGS. 1 to 8. A vehicle 1, according to the embodiment, is a hybrid car which can be driven by an internal combustion engine 10 and an electric motor 35. In other words, this vehicle 1 has an electronic control unit 5, such as an engine control unit (ECU), an internal combustion engine 10, a generator 31 for generating power based on the rotation force of the internal combustion engine 10, a battery 33 for storing power generated by the generator 31, an electric motor 35 for driving using the power of the generator 31 or the battery 33, an inverter 37 which selectively applies the power generated by the generator 31 to the electric motor 35 and battery 33, or applies the power stored in the battery 33 to the electric motor 35, a power distribution mechanism 39 for distributing the rotation force of the internal combustion engine 10 to the generator 31 and wheels 47 via a reduction gear 43, an electric motor rotary shaft 41, a reduction gear 43, a drive shaft 45, and wheels 47 (see FIG. 1).

The electronic control unit 5 has a central processing unit (CPU), a read only memory (ROM) which stores control programs, a random access memory (RAM) for storing various data, and other components. Signals from various sensors, including an adsorbent temperature sensor 21a, are input to the electronic control unit 5. The electronic control unit 5 outputs control signals, and controls each component of the vehicle 1. In particular, the electronic control unit 5 controls the opening of the switching valve 19, based on the information on the intake air amount Ga measured by an air flow meter 13. The valve opening control of the switching valve 19 will be described in detail later.

The internal combustion engine 10 has a main engine body 11, an intake passage 12, an air flow meter 13, an exhaust passage 15, an air-fuel ratio sensor 16, a pre-catalyst 17, an $O_2$ sensor 18, a switching valve (desorption amount adjustment unit) 19, a bypass passage 20 disposed in the exhaust passage 15, an adsorbent 21, an adsorbent temperature sensor 21a, a main catalyst 22 which is disposed in the exhaust passage 15 at a downstream side of a portion where the bypass passage 20 merges, an exhaust gas sensor 23, and a crank shaft 25.

During normal operation of the internal combustion engine 10, air is taken in from the intake passage 12 to a combustion chamber of each cylinder of the main engine body 11 via an intake valve (not illustrated) (see the dotted arrow in FIG. 1). The air flow meter 13 is used to measure a flow rate of air that flows into the intake passage 12, in other words, an intake air amount Ga. The intake air amount Ga is used to control a throttle valve (not illustrated), but according to the embodiment, a value generated by performing time integration on the intake air amount Ga is used for the valve opening control of the switching valve 19, as an integration value of the air amount which passed through the air flow meter 13, that is, an integrated air amount gs, or as an integrated value of the air amount which passed through the air flow meter 13 during execution of fuel cut, that is, an integrated fuel cut air amount fgs. The value of the integrated fuel cut air amount fgs is updated every time fuel cut is performed, and is recorded in RAM of the electronic control unit 5, for example. The value of the integrated air amount gs is updated whenever necessary when air passes through the air flow meter 13, and is recorded in RAM of the electronic control unit 5, for example.

Fuel injected from the injector mixes with the intake air, and generates an air-fuel mixture. The air-fuel mixture burns by the ignition of a spark plug based on an ignition signal from the control unit 5. The crank shaft 25 is rotated by a reciprocating motion of a piston according to the explosive power generated by the combustion of the air-fuel mixture.

The exhaust gas discharged from the combustion chamber is discharged through the exhaust passage 15 and by passing through the bypass passage 20 via an exhaust valve (not illustrated), (see the solid arrow in FIG. 1). The air-fuel ratio (A/F) of the exhaust gas is detected by the air-fuel ratio sensor 16 disposed in the exhaust passage 15, and air-fuel ratio feedback correction (adjustment of fuel amount injected from the injector, optimization of oxidation-reduction amount) is performed based on this ratio. The exhaust gas is also purified by the pre-catalyst 17 disposed in the upstream of the exhaust passage 15 and the main catalyst 22 disposed in the downstream of the exhaust passage 15. The amount of $O_2$ at the outlet of the pre-catalyst 17 (air-fuel ratio after exhaust gas is purified by the pre-catalyst 17) is detected by an $O_2$ sensor 18 disposed between the pre-catalyst 17 and the switching valve 19, and the feedback correction amount in the above mentioned air-fuel ratio feedback correction is adjusted based on the detected $O_2$ amount.

During fuel cut, however, exhaust gas is not generated since the fuel injection from the injector is stopped, and the intake air flows through the exhaust passage 15 or the bypass passage 20. The fuel cut according to the embodiment is not only a normal fuel cut which is performed according to the driving state of the vehicle 1, such as the deceleration time, but also includes the later mentioned forced fuel cut, which is performed under a predetermined condition (see step S34 in FIG. 5), in order to increase the oxygen to be stored into the main catalyst 22 by increasing the integrated fuel cut air amount fgs. The oxygen stored in the main catalyst 22 is used for purifying (oxidizing) unburned components in the exhaust gas, such as HC. Particularly in the embodiment, the oxygen taken in and stored in the main catalyst 22 during fuel cut is mainly used to purify the unburned components desorbed from the adsorbent 21.

The switching valve 19 is a valve to switch a part or all of the passages of the exhaust gas discharged from the combustion chamber of the main engine body 11 (during normal driving) or air which passed through the combustion chamber (during fuel cut) from the exhaust passage 15 to the bypass passage 20. The opening a of the switching valve 19 is controlled based on the operation state of the internal combustion engine 10. If the opening a of the switching valve 19 is a minimum value: 0 degrees, that is in the case of full close state, all of the exhaust gas or air flows through the exhaust passage 15, and reaches the main catalyst 22. If the opening a of the switching valve 19 is greater than the minimum value:

0 degrees, and smaller than the maximum value: Amax (=90 degrees) (0 degrees<a<Amax), a part of the exhaust gas or air flows through the bypass passage 20, and reaches the main catalyst 22, and the rest of the exhaust gas or air flows through the exhaust passage 15, and reaches the main catalyst 22. If the opening a of the switching valve 19 is the maximum value, Amax, that is, in full open state, all of the exhaust gas or air flow through the bypass passage 20, and reaches the main catalyst 22.

The adsorbent 21 disposed in the bypass passage 20 is made of zeolite or the like, and adsorbs unburned components in the exhaust gas, such as HC, during low temperature, and desorbs the unburned components during high temperature. In concrete terms, the unburned components included in the exhaust gas that flows through the bypass passage 20 are adsorbed by the adsorbent 21 when the temperature of the adsorbent 21 is low, such as the case of cold start. In a state where warming up completes, and the adsorbent 21 is sufficiently warmed up by the exhaust gas, the adsorbed unburned components are desorbed from the adsorbent 21, and reach the main catalyst 22 along with the exhaust gas or air that flows through the bypass passage 20.

The adsorbent temperature sensor 21a is used for measuring the temperature T of the adsorbent 21. In the embodiment, the adsorbent temperature sensor 21a is installed so as to contact the adsorbent 21, and measures the temperature T. According to another mode, however, the adsorbent temperature sensor 21a may be disposed at the downstream side of the adsorbent 21 so that exhaust gas temperature at this portion is measured, and the temperature T of the adsorbent 21 is calculated (or estimated) based on this measurement result. When the temperature T of the adsorbent 21 reaches the temperature threshold $T_0$, which is set to about 350° C., the unburned components adsorbed by the adsorbent 21 are completely desorbed (see step S19 in FIG. 4).

During the cold start of the internal combustion engine 10 until warm up completes (see t11 to t12 in FIG. 8), the pre-catalyst 17 and the main catalyst 22 have not warmed up to an activation temperature or higher, and cannot purify the exhaust gas sufficiently. Therefore, during this period, the switching valve 19 is set to full open state (a=90 degrees), so that unburned components are adsorbed by the adsorbent 21. As a result, all the exhaust gas discharged from the main engine body 11 flows through the bypass passage 20. During this period, the temperature of the exhaust gas is not high, and the adsorbent 21 is not warmed up very much by the exhaust gas. Hence the unburned components contained in the exhaust gas are adsorbed by the adsorbent 21 in low temperature state, and do not reach the main catalyst 22 at this point.

After warm up completes (see t12 in FIG. 8), the switching valve 19 is set to full close state (a=0 degrees), and all the exhaust gas discharged from the main engine body 11 flows through the exhaust passage 15, not passing through the bypass passage 20. The exhaust gas discharged from the main engine body 11 does not reach the adsorbent 21, so a temperature rise of the adsorbent 21 is suppressed, and the unburned components adsorbed by the adsorbent 21 are held in an undesorbed state.

After being set to full close state, purge control, to desorb the unburned components adsorbed by the adsorbent 21, is started. The procedure of the purge control is described with reference to the flow charts in FIGS. 4 to 7. In the purge control, the opening a of the switching valve 19 is gradually increased. In concrete terms, the switching valve 19 is controlled such that the valve opening a increases as the integrated fuel cut air amount fgs increases (see FIG. 2 and steps S11 to S18 in FIG. 4). In the embodiment, not only is normal fuel cut performed according to the operation state of the internal combustion engine 10, but also a forced fuel cut, which quickly stores the oxygen in the air acquired by intake, into the exhaust gas purification catalyst 22, is performed under predetermined conditions (see steps S31 to S34 in FIG. 5).

After warm up completes, the temperature of the exhaust gas flowing through the bypass passage 20 is high, and the temperature T of the adsorbent 21 increases by this high temperature exhaust gas passing through, and unburned components, adsorbed by the adsorbent, desorb. When the opening a of the switching valve 19 increases, the temperature T of the adsorbent 21 rises, and the unburned component amount increases as the exhaust gas, flowing into the adsorbent 21, increases. In order to purify the unburned components desorbed from the adsorbent 21 in the main catalyst 22, on the other hand, sufficient oxygen to purify the desorbed unburned components must be supplied to the main catalyst 22. For this, according to the embodiment, the opening a of the switching valve 19 is increased corresponding to the increase of the oxygen supply amount to the main catalyst 22, which is estimated based on the value of the integrated fuel cut air amount fgs. Thereby, the amount of the unburned components desorbed from the adsorbent 21 is adjusted so as not to exceed the amount which the main catalyst 22 can purify.

Figure 6:
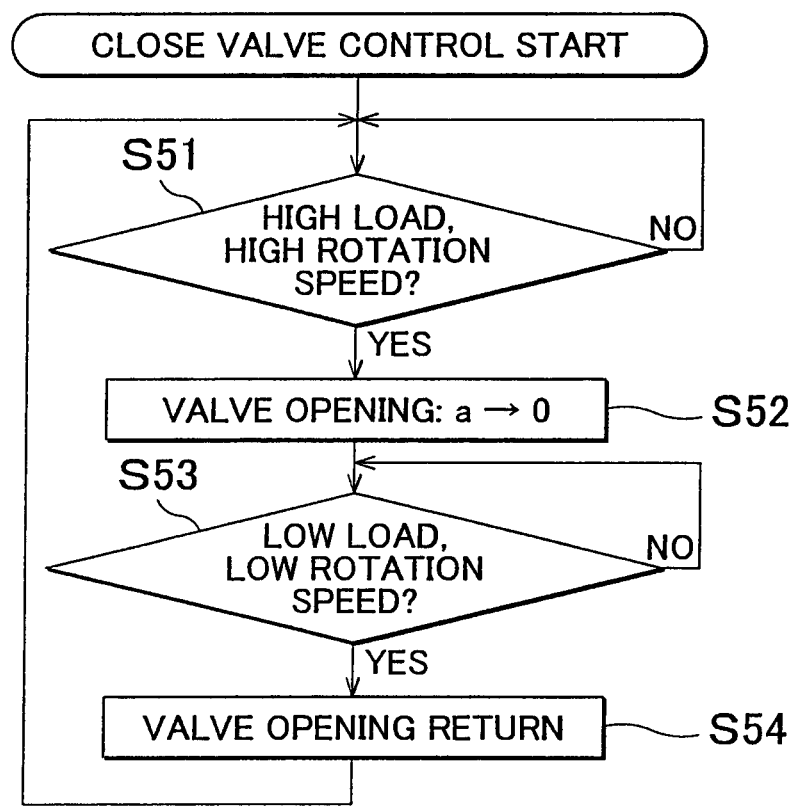
FIG. 6 is a flow chart showing a procedure of valve closing control, which is executed in parallel with the execution of the main routine, according to the embodiment.

If load on the internal combustion engine 10 is high and the rotation speed of the internal combustion engine 10 is high, for example, the switching valve 19 is temporarily set to full close state (a=0 degrees) (see step S52 in FIG. 6). In such a case, a large amount of exhaust gas is discharged from the main engine body 11, so if a large amount of exhaust gas flows into the adsorbent 21, the temperature T of the adsorbent 21 rapidly rises. If the temperature rises rapidly, unburned components adsorbed by the adsorbents 21 may be excessively desorbed up to a degree which the main catalyst 22 cannot sufficiently purify. Also, a large amount of exhaust gas that flows may make it difficult to maintain the accuracy of adjusting the opening a of the switching valve 19. Therefore, in such a state, the switching valve 19 is set to full close state, so that the exhaust gas does not flow through the bypass passage 20, and the desorption amount becomes 0 degrees, whereby the robustness of the desorption control is improved.

Figure 7:
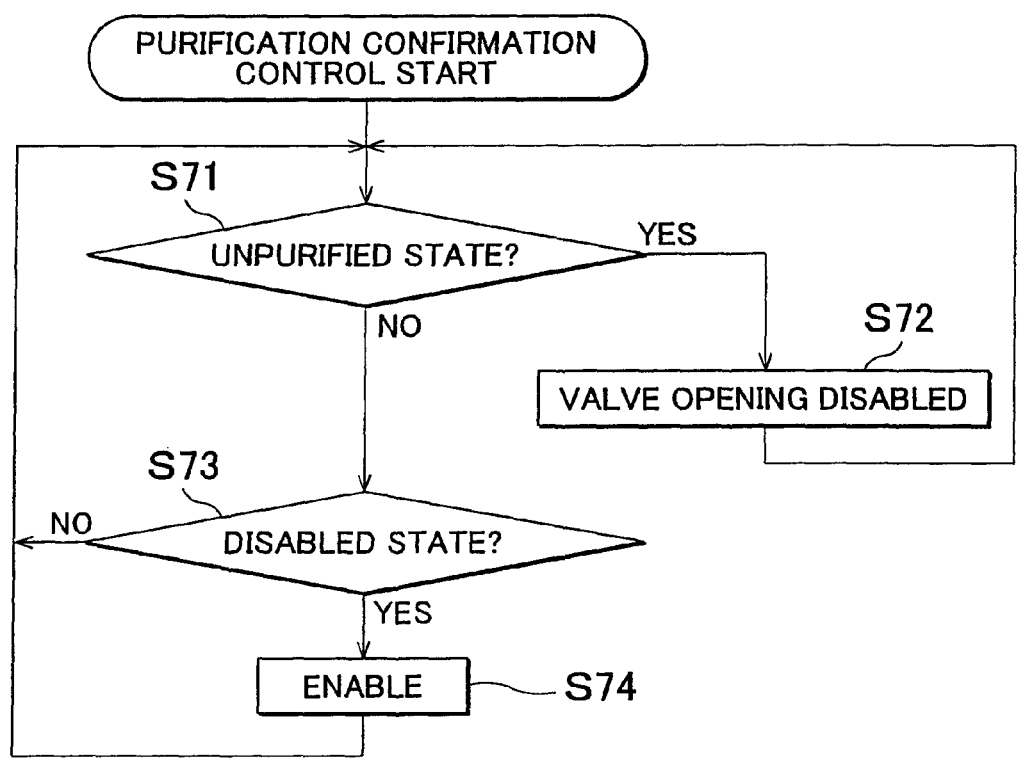
FIG. 7 is a flow chart showing a procedure of purification confirmation control, which is executed in parallel with the execution of the main routine, according to the embodiment.

If purification of the unburned components desorbed from the adsorbent 21 have not been sufficiently performed by the main catalyst 22, the opening a of the switching valve 19 is maintained in a same state or a slightly closed state, until this purification is sufficiently performed (see step S72 in FIG. 7). Normally unburned components can be appropriately purified in the main catalyst 22 by adjusting the opening a of the switching valve 19 corresponding to the integrated fuel cut air amount fgs. However, the estimated oxygen supply amount from the integrated fuel cut air amount fgs to the main catalyst 22 may be insufficient to purify the unburned components desorbed from the adsorbent 21. In such a case, the desorbed unburned components are discharged without being purified by the main catalyst 22. Hence, the opening a of the switching valve 19 is adjusted so that the desorption of the unburned components is suppressed, in other words, the opening a of the switching valve 19 does not become large. The reason why the current valve opening a is maintained without completely closing the valve at this time is that the temperature of the adsorbent 21 is kept constant by passing a predetermined quantity of exhaust gas.

Whether the unburned components desorbed from the adsorbent 21 have been purified by the main catalyst 22 or not is determined depending on whether the amount of the unburned components contained in the exhaust gas is low or not, based on the information from the exhaust gas sensor 23 disposed at downstream of the main catalyst 22 (information on the exhaust gas components). The $O_2$ sensor may be installed instead of the exhaust gas sensor 23, so that whether the unburned components have been purified or not is determined based on the information from this $O_2$ sensor (information on $O_2$ amount discharged from the main catalyst 22).

The operation to transfer the rotation force generated by the internal combustion engine 10 to the wheels 47 is described next.

The rotation force of the crankshaft 25 is transferred to the power distribution mechanism 39, and is distributed and transferred to the generator 31 and the electric motor rotary shaft 41 by the power distribution mechanism 39. The rotation force of the electric motor rotary shaft 41 is based not only on the rotation force transferred from the internal combustion engine 10, but also on the rotation force of the electric motor 35. The reduction gear 43 decelerates the rotation force of the electric motor rotary shaft 41 based on the rotation force of at least one of the internal combustion engine 10 and electric motor 35, and transfers the rotation force to the drive shaft 45, and rotates the wheels 47 to run the vehicle 1.

When the vehicle 1 starts or is in low load state, transfer of the rotation force from the internal combustion engine 10 is cut-off, or operation of the internal combustion engine 10 is stopped, and the electric motor 35 is rotated by the power from the battery 33, and the wheels 47 are rotated by the rotation force of the electric motor 35 to run the vehicle 1.

Particularly under predetermined conditions, such as a low load steady operation state, forced-fuel cut is performed. In this case, the internal combustion engine 10 is driven by the rotation force of the electric motor 35, air is taken into the main catalyst 22 from the intake passage 12 via the exhaust passage 15, and oxygen in the air is stored in the main catalyst 22.

When the vehicle 1 is in medium load state, that is during normal running, the rotation force of the internal combustion engine 10 is distributed and transferred to the generator 31 and the wheels 47, and the electric motor 35 is rotated by the power generated by the generator 31, and the rotation force of the electric motor 35 is transferred to the wheels 47. In this case, the wheels 47 are rotated by the rotation force of the internal combustion engine 10 and the rotation force of the electric motor 35 based on the power supplied from the generator 31 to run the vehicle 1.

When the vehicle 1 load is in high load state, such as during acceleration, the rotation force of the internal combustion engine 10 is distributed and transferred to the motor 31 and wheels 47, and the electric motor 35 is rotated by the power generated in the generator 31 or the power from the battery 33, and the rotation force of the electric motor 35 is transferred to the wheels 47. In this case, the wheels 47 are rotated by the rotation force of the internal combustion engine 10 and the rotation force of the electric motor 35 based on the power supplied from the generator 31 and the battery 33, to run the vehicle 1.

When the vehicle 1 decelerates, the rotation force of the wheels 47 is transferred to the electric motor 35 to perform regenerative power generation, and the obtained power is stored in the battery 33. During this time, a normal fuel cut is performed, the internal combustion engine 10 is driven by the rotation force of the wheels 47, air is taken into the main catalyst from the intake passage 12 via the exhaust passage 15, and oxygen in the air is stored in the main catalyst 22.

The predetermined conditions to perform forced-fuel cut are as follows. First condition: the integrated fuel cut air amount fgs and the integrated air amount gs are in a predetermined relationship, such as the operation state, where normal fuel cut is not performed, continues, and because of this, the speed of increase of the oxygen amount to be supplied to the main catalyst 22, which is estimated based on the integrated fuel cut air amount fgs, is not faster than the speed of increase of the integrated air amount gs, in other words, the speed of opening of the switching valve 19 is not faster than the speed of increase of the integrated air amount gs, and second condition: the driving of the vehicle by the internal combustion engine 10 is unnecessary, such as the case of a low load steady operation state, in which the vehicle 1 is running based only on the rotation force of the electric motor 35.

Figure 5:
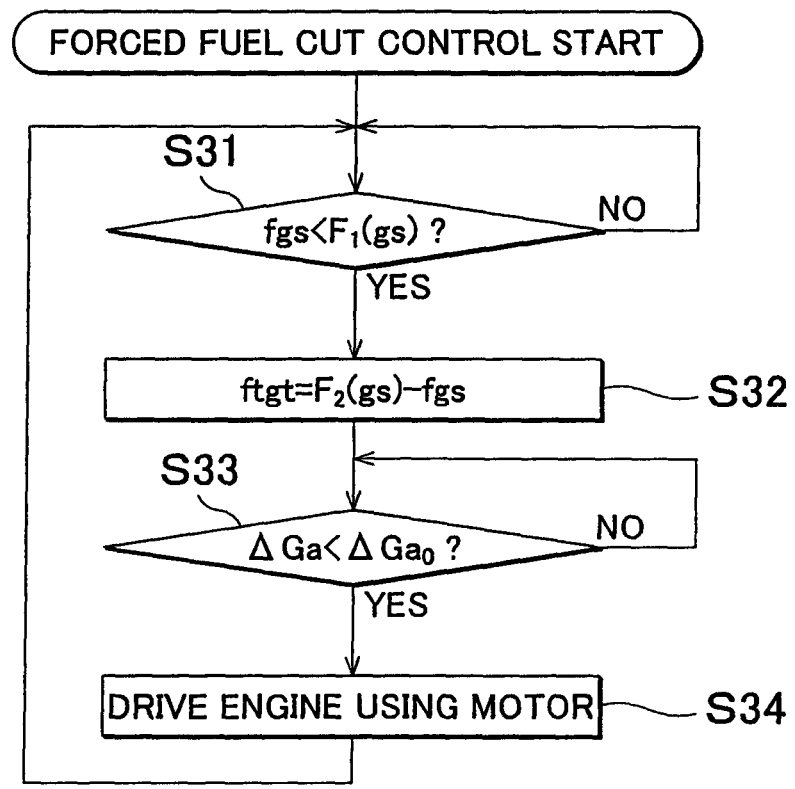
FIG. 5 is a flow chart showing a procedure of a forced fuel cut, which is executed in parallel with the execution of the main routine, according to the embodiment.

Whether the first condition is satisfied or not is determined depending on whether the integrated fuel cut air amount fgs is smaller than a first reference value $F_1$ (gs) (see step S31 in FIG. 5). If the integrated fuel cut air amount fgs is smaller than the first reference value $F_1$ (gs), it is determined that the integrated fuel cut air amount fgs and the integrated air amount gs are in a predetermined relationship. Whether the second condition is satisfied or not is determined depending on whether the change amount $\Delta Ga$ of the intake air amount predetermined time Ga (g/s) is smaller than a change amount threshold $\Delta Ga_0$ (see step S33 in FIG. 5).

Figure 3:
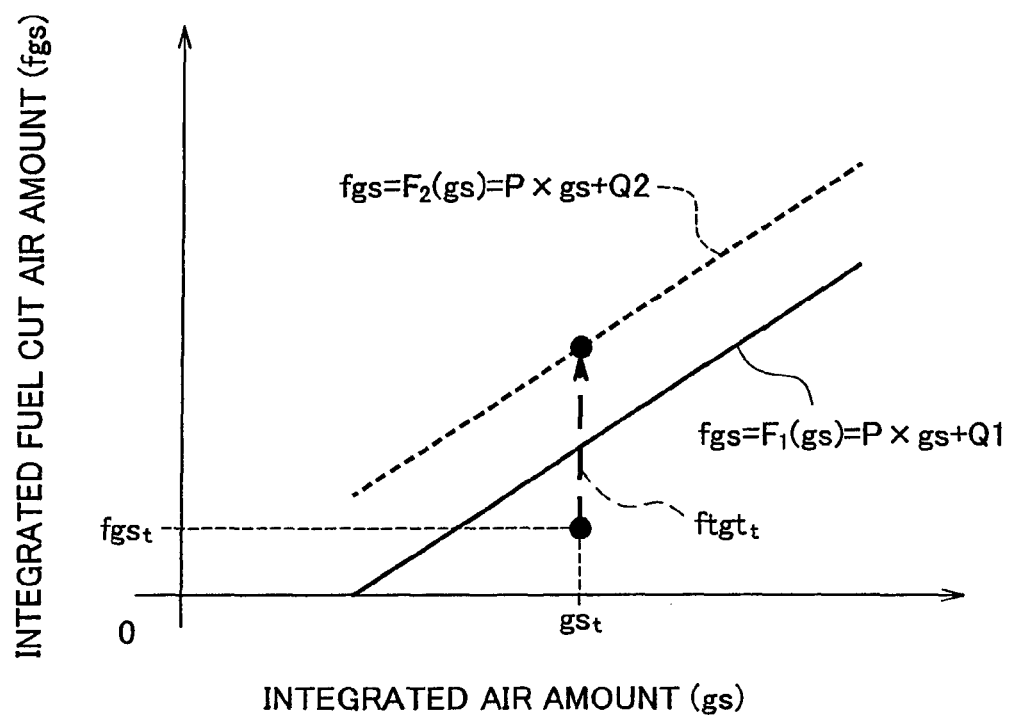
FIG. 3 is a graph showing a relationship of the integrated air amount and the integrated fuel cut air amount according to the embodiment.

The first reference value $F_1$ (gs) is used to determine whether the integrated fuel cut air amount fgs and the integrated air amount gs are in a predetermined relationship, and is expressed by the relational expression fgs=$F_1$(gs)=P×gs+Q1 (P and Q1 are constants, see FIG. 3).

Forced-fuel cut is performed by driving the internal combustion engine 10 by the rotation force of the electric motor 35, so that the air is taken into the combustion chamber of the main engine body 11 by the difference value ftgt between a second reference value $F_2$ (gs), which is greater than the first reference value $F_1$ (gs), and the integrated fuel cut air amount fgs. (ftgt=$F_2$(gs)−fgs) (see step S34 in FIG. 5).

The second reference value $F_2$ (gs) is used to cancel the state where the integrated fuel cut air amount fgs and the integrated air amount gs satisfy a predetermined relationship. For example, $F_2$ (gs) is expressed by the relational expression fgs=$F_2$(gs)=P×gs+Q2 (Q2 is a constant greater than Q1, see FIG. 3).

If the first reference value $F_1$ ($gs_t$), which is calculated based on the integrated air amount $gs_1$ at a certain point of time t, is greater than the integrated fuel cut air amount $fgs_t$ ($fgs_t$<$F_1$ ($gs_t$)), it is determined that the integrated fuel cut air amount fgs and the integrated air amount gs are in a predetermined relationship. In this case, driving the internal combustion engine 10 by the rotation force of the electric motor 35 is performed so that air is taken into the combustion chamber of the main engine body 11 by the difference value $ftgt_t$ (=$F_2$ ($gs_t$)−$fgs_t$). The integrated fuel cut air amount fgs and the integrated air amount gs increase by the difference value $ftgt_t$ by the driving the internal combustion engine 10 by the rotation force of the electric motor 35, and as a result, the integrated fuel cut air amount fgs approaches the first reference value $F_1$ (gs). By repeating this, the integrated fuel cut air amount fgs becomes a value greater than the first reference value $F_1$ (gs) (see FIG. 3).

Figure 4:
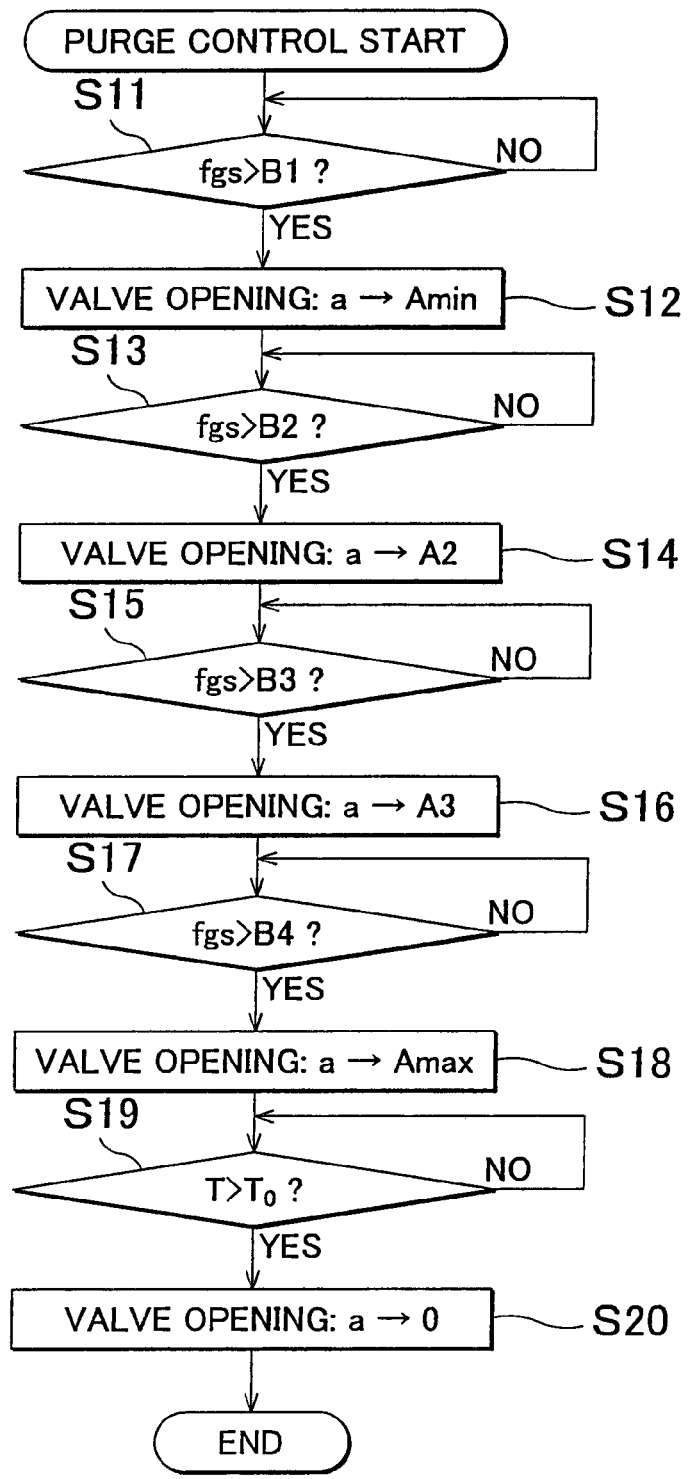
FIG. 4 is a flow chart showing a procedure of a main routine to perform purge control according to the embodiment.

A procedure of the purge control to desorb the unburned components adsorbed by the adsorbent 21 is described next, with reference to the flow charts in FIGS. 4 to 7. First the main routine of the purge control is described with reference to the flow chart in FIG. 4. At cold start, the switching valve 21 is set to the full open state in order to adsorb the unburned components to the adsorbent 21, then the switching valve 19 is set to the full close state (t12 or later in FIG. 8), and the purge control shown in the flow chart in FIG. 4 is started.

If it is in the later mentioned valve opening disable state in step S72 in FIG. 7, the operations in steps S12, S14, S16 and S18 are not executed unless the state is cancelled in step S74. In the main routine shown in FIG. 4, the procedure to increase the opening a of the switching valve 19 in four separate states, but the number of stages is not limited to four. The values of the integrated fuel cut air amount fgs and the integrated air amount gs are reset when the purge control starts.

Figure 2:
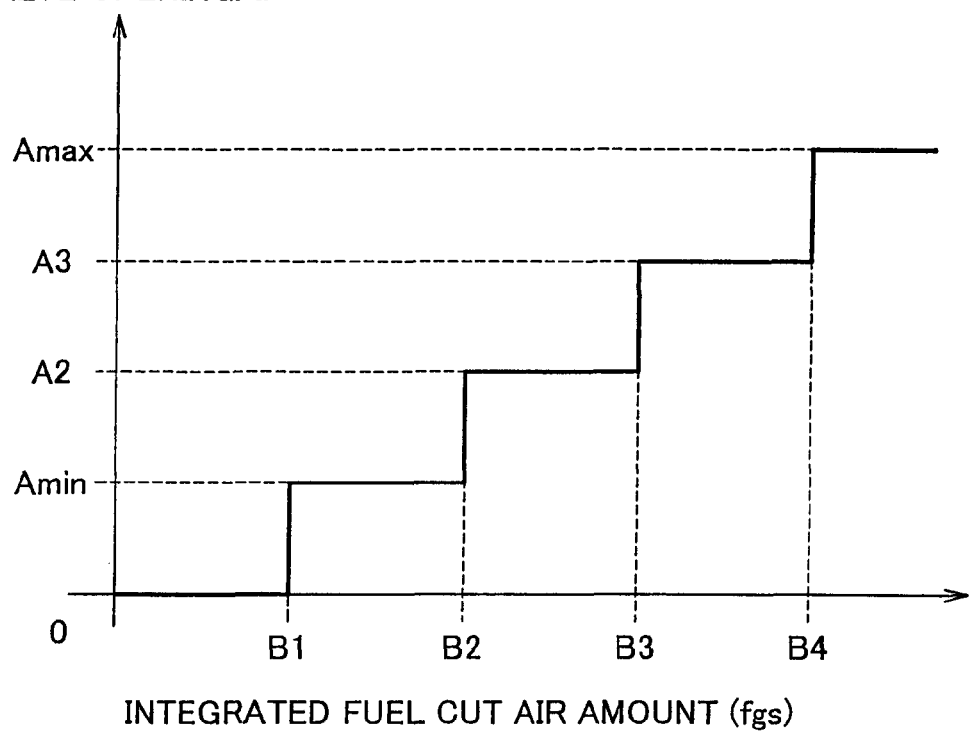
FIG. 2 is a graph showing a relationship of the integrated fuel cut air amount and the opening of the switching valve according to the embodiment.

The first to fourth target values B1 to B4 are set to express the relationship B1<B2<B3<B4, and the values of the valve opening are set to express the relationship Amin<A2<A3<Amax (see FIG. 2).

When the purge control starts, whether the integrated fuel cut air amount fgs has become higher than the first target value B1 or not is determined in step S11. If higher, processing advances to step S12. If not, step S11 is repeated. In step S12, the opening a of the switching valve 19 is set to the first opening Amin, that is, a state where the switching valve 19 is slightly more open from the full close state (a=0 degrees). By this, the temperature T of the adsorbent 21 gently rises due to the exhaust gas that flows into the adsorbent 21, and the desorption of the adsorbed unburned components starts. The oxygen supply amount in the main catalyst 22 increases as the integrated fuel cut air amount fgs increases, and the unburned components desorbed from the adsorbent 21 are purified in the main catalyst 22.

In step S13, whether the integrated fuel cut air amount fgs has become higher than the second target value B2 or not is determined. If higher, processing advances to step S14. If not, step S13 is repeated. In step S14, the opening a of the switching valve 19 is set to the second valve opening A2.

In step S15, whether the integrated fuel cut air amount fgs has become higher than the third target value B3 or not is determined. If higher, processing advances to step S16. If not, step S15 is repeated. In step S16, the opening a of the switching valve 19 is set to the third valve opening A3.

In step S17, whether the integrated fuel cut air amount fgs has become higher than the fourth target value B4 or not is determined. If higher, processing advances to step S18. If not, step S17 is repeated. In step S18, the opening a of the switching valve 19 is set to the maximum value Amax, and the switching valve 19 is set to the full open state.

In this way, the opening a of the switching valve 19 is gradually increased as the integrated fuel cut air amount fgs increases, whereby the exhaust gas that flows into the bypass passage 20 increases, the temperature T of the adsorbent 21 increases, and the desorption amount of the unburned components adsorbed by the adsorbent 21 increases. During this time, the oxygen supply amount in the main catalyst 22 has also been increased, corresponding to the increase of the integrated fuel cut air amount fgs, so the unburned components desorbed from the adsorbent 21 are purified in the main catalyst 22.

In step S19, whether the temperature T of the adsorbent 21 has exceeded the temperature threshold $T_0$ or not is determined. If not, step S19 is repeated, since desorption of the unburned components adsorbed by the adsorbent 21 is not completed. If exceeded, processing advances to step S20, since desorption of the unburned components adsorbed by the adsorbent 21 is completed. In step S20, the opening a of the switching valve 19 is set to the minimum value: 0 degrees, and the switching valve 19 becomes the full close state. Then the purge control is terminated. FIG. 8 is an experiment example when steps S11 to S19 of the main routine are executed, where the valve closing operation in step S20 is omitted.

It is possible that driving of the vehicle 1 ends in the middle of the above mentioned routine, that is, in a state where desorption of the unburned components adsorbed by the adsorbent 21 has not been completed. In this case, if the cold start of the internal combustion engine 10 of the vehicle 1 occurs, the main routine starts from the first procedure (step S11). If the vehicle 1 is started in a warm up state, however, the main routine starts with the step which was terminated without completed the last time.

A procedure to execute the forced-fuel cut during purge control is described next, with reference to the flow chart in FIG. 5. The forced-fuel cut control is executed at any time during the progress of the main routine shown in FIG. 4.

When the forced-fuel cut control is started, it is determined whether the integrated fuel cut air amount fgs is smaller than the first reference value $F_1$ (gs) or not as the determination of the first condition in step S31. If not, step S31 is repeated, since the integrated fuel cut air amount fgs and the integrated air amount gs are not in a predetermined relationship. If smaller, processing advances to step S32, since the integrated fuel cut air amount fgs and the integrated air amount gs are in a predetermined relationship. In step S32, a difference value ftgt between the second reference value $F_2$ (gs) and the integrated fuel cut air amount fgs is calculated as the air amount that is taken in under the forced-fuel cut state.

In step S33, a change amount ΔGa of the air amount that is taken into the combustion chamber of the main engine body 11 (intake air amount Ga) per predetermined time is calculated based on the intake air amount Ga measured by the air flow meter 13, and whether this value is smaller than the change amount threshold $ΔGa_0$ or not is determined as the determination of the second condition. If not, step S33 is repeated, since it is not a state of executing forced-fuel cut, such as the case of vehicle 1 not being in a steady running state. If smaller, processing advances to step S34.

In step S34, forced-fuel cut is executed, in other words, the internal combustion engine 10 is driven by the rotation force of the electric motor 35, so that air for the amount of the difference value ftgt, calculated in step S32, is taken into the combustion chamber of the main engine body 11, then processing returns to step S31.

A procedure to close the switching valve 19, to improve the robustness of the desorption control during the purge control, is described next, with reference to the flow chart in FIG. 6. The valve closing control of the switching valve 19 is executed at any time during the progress of the main routine shown in FIG. 4.

When valve closing control is started, it is determined whether the load on the main engine body 11 is high and the rotation speed of the main engine body 11 is high or not in step S51. If at least one of these conditions is not satisfied, step S51 is repeated since closing the switching valve 19 is unnecessary. If both of these conditions are satisfied, the opening a of the switching valve 19 is set to the minimum value: 0 degrees, in step S52, and the switching valve 19 becomes the full close state.

In step S53, it is determined whether the load on the main engine body 11 is low and the rotation speed of the main engine body 11 is low. If at least one of these conditions is not satisfied, step S53 is repeated, since the valve closed state should not be cleared. If both of these conditions are satisfied, the closed state of the switching valve 19 is cleared in step S54, and the opening of the switching valve 19 is set to the valve opening a before the switching valve 19 was set to the valve close state in step S52. Then processing returns to step S51. The threshold of the load and the threshold of the rotation speed in step S53 are set to values slightly lower than the threshold of the load and threshold of the rotation speed in step S51.

A procedure to confirm whether desorbed unburned components have been sufficiently purified in the main catalyst 22 or not during the purge control is described next, with reference to the flow chart in FIG. 7. The purification confirmation control is executed at any time during the progress of the main routine shown in FIG. 4.

When the purification confirmation control is started, it is determined whether the unburned components desorbed from the adsorbent 21 have been purified in the main catalyst 22 based on the information from the exhaust gas sensor 23 in step S71. If the amount of the unburned components is high in the exhaust gas components measured by the exhaust gas sensor 23, that is, if purification in the main catalyst 22 is not sufficient, processing advances to step S72. If the amount of the unburned component is low and purification is sufficiently being performed, processing advances to step S73.

In step S72, the switching valve 19 is set to the valve opening disabled state where the control to increase opening a of the switching valve 19 is disabled. By this, the operation in steps S12, S14, S16 and S18 in the main routine in FIG. 4 are disabled.

In step S73, whether the switching valve 19 is in the valve opening disabled state or not is determined. If not, processing returns to step S71. If disabled, the valve opening disabled state is cleared in step S74, then processing returns to step S71. By this, operations in steps S12, S14, S16 and S18 in the main routine in FIG. 4 are enabled.

By the above control, the purge control to purify unburned components appropriately in the main catalyst 22 can be performed, while controlling the desorption amount of the unburned components adsorbed by the adsorbent 21 according to the increase of the integrated fuel cut air amount fgs. The oxygen required for purifying the unburned components desorbed from the adsorbent 21 is supplied to the main catalyst 22 using the fuel cut, so it is unnecessary to separately provide additional device to inject air, such as an air injection device.

According to the embodiment, the opening of the switching valve 19 is controlled based not only on the integrated fuel cut air amount fgs, but also on the operating state of the main engine body 11 and the exhaust gas component at downstream of the main catalyst 22, therefore a drop in the purification rate of the main catalyst 22 can be prevented correspondingly to a sudden increase in the amount of desorption of the unburned components, and purification of the unburned components can be appropriately performed.

Also according to the embodiment, forced-fuel cut is executed in addition to the normal fuel cut, so that the oxygen to be stored in the main catalyst 22 can be increased as quickly as possible. Therefore, a drop in the purification rate of the main catalyst 22 can be prevented without the influence of the running state of vehicle 1, and desorption of the unburned components adsorbed by the adsorbent 21 can be completed quickly. By completing desorption quickly, the time of the exhaust gas flowing into the bypass passage 20 can be decreased, so the thermal deterioration of the adsorbent 21 can be suppressed, and also an increase in fuel consumption due to an increase in exhaust resistance when the exhaust gas passes through the bypass passage 20 can be suppressed.

In the embodiment, the vehicle 1 is a hybrid car, which can be driven by the internal combustion engine 10 and the electric motor 35, was described, but the vehicle 1 may be a vehicle which can be driven only by the internal combustion engine 10.

The invention claimed is:

1. An exhaust gas purification device, comprising:
a bypass passage disposed in an exhaust passage of an internal combustion engine;
an adsorbent which is disposed in the bypass passage, and adsorbs unburned components in exhaust gas at a low temperature and desorbs the adsorbed unburned components at a high temperature;
an exhaust gas purification catalyst which is disposed in the exhaust passage at a downstream side of a portion where the bypass passage merges, and purifies the unburned components in exhaust gas;
an electronic control unit, including program logic, configured to output control signals; and
a switching valve configured to adjust a desorption amount of the unburned components adsorbed by the adsorbent based on an adjusting-desorption-amount control signal output from the electronic control unit;
wherein the adjusting-desorption-amount control signal output from the electronic control unit is based on an integrated fuel cut air amount, which is an integrated value of an air amount taken into a combustion chamber of the internal combustion engine during execution of fuel cut; and
wherein the electronic control unit, including the program logic, is configured to:
output an increasing-desorption-amount control signal to the switching valve to increase the desorption amount as the integrated fuel cut air amount increases;
output a not-increasing-desorption-amount control signal to the switching valve to not increase the desorption amount when a determination is made that the unburned components desorbed from the adsorbent have not been purified in the exhaust gas purification catalyst; and
output a decreasing-desorption-amount control signal to the switching valve to decrease the desorption amount when a determination is made that a state is established where the internal combustion engine discharges a large amount of exhaust gas to the exhaust passage.

2. A vehicle having the exhaust gas purification device according to claim 1, wherein
the vehicle is driven by at least one of the internal combustion engine and an electric motor, and
the internal combustion engine is driven by the electric motor, and the fuel cut is performed, based on a relationship between the integrated fuel cut air amount and an integrated air amount, which is an integrated value of the air amount taken into the combustion chamber.

3. An exhaust gas purification device, comprising:
a bypass passage disposed in an exhaust passage of an internal combustion engine;
an adsorbent which is disposed in the bypass passage, and adsorbs unburned components in exhaust gas at a low temperature and desorbs the adsorbed unburned components at a high temperature;
an exhaust gas purification catalyst which is disposed in the exhaust passage at a downstream side of a portion where the bypass passage merges, and purifies the unburned components in exhaust gas;
a switching valve that switches a passage of a part or all of exhaust gas or air discharged from the internal combustion engine, from the exhaust passage to the bypass passage;

an electronic control unit, including program logic, configured to control an opening of the switching valve based on an integrated fuel cut air amount, which is an integrated value of an air amount taken into a combustion chamber of the internal combustion engine during execution of fuel cut;

an air flow meter disposed in an intake passage of the internal combustion engine; and an exhaust gas sensor that detects the unburned components in exhaust gas discharged from the exhaust gas purification catalyst;

wherein the integrated fuel cut air amount is a value generated by performing time integration on the intake air amount during fuel cut; and wherein the electronic control unit, including the program logic, is further configured to:

increase an opening of the switching valve as the integrated fuel cut air amount increases; and not increase the opening of the switching valve when a determination is made that the unburned components desorbed from the adsorbent have not been purified in the exhaust gas purification catalyst based on information from the exhaust gas sensor.

4. The exhaust gas purification device according to claim 3, further comprising a temperature sensor that measures the temperature of the adsorbent, wherein the electronic control unit, including the program logic, is further configured to set the opening of the switching valve to 0 degrees when the temperature of the adsorbent based on the temperature sensor exceeds a temperature threshold that is a temperature at which the unburned components adsorbed by the adsorbent are desorbed.

5. The exhaust gas purification device according to claim 3, wherein the electronic control unit, including the program logic, is further configured to set the opening of the switching valve to 0 degrees when determination is made that a state is established where the internal combustion engine discharges a large amount of exhaust gas to the exhaust passage.

6. The exhaust gas purification device according to claim 3, wherein the electronic control unit, including the program logic, is further configured to set the opening of the switching valve to 0 degrees when the internal combustion engine has high load and high rotation, and sets the opening of the switching valve to the opening set before controlling to 0 degrees when the internal combustion engine has low load and low rotation.

7. A vehicle having the exhaust gas purification device according to claim 3, wherein the vehicle is driven by at least one of the internal combustion engine and an electric motor, and the electronic control unit, including the program logic, is further configured to drive the internal combustion engine by a rotation force of the electric motor and performs fuel cut, based on a relationship between the integrated fuel cut air amount and an integrated air amount, which is an integrated value of the air amount taken into the combustion chamber.

8. The vehicle according to claim 7, wherein when the integrated fuel cut air amount is smaller than a first reference value, the internal combustion engine is driven by a rotation force of the electric motor and the air amount for a difference between a second reference value and the integrated fuel cut air amount is taken into the combustion chamber.

9. An exhaust gas purification method for an exhaust gas purification device having a bypass passage disposed in an exhaust passage of an internal combustion engine, an adsorbent which is disposed in the bypass passage, and adsorbs unburned components in exhaust gas at a low temperature and desorbs the adsorbed unburned components at a high temperature, and an exhaust gas purification catalyst, which is disposed in the exhaust passage at a downstream side of a portion where the bypass passage merges, and purifies the unburned components in exhaust gas, the method comprising:

adjusting, during desorption of the adsorbed unburned components, an amount of exhaust gas or air which flows into the adsorbent based on an integrated fuel cut air amount, which is an integrated value of an air amount taken into a combustion chamber of the internal combustion engine during execution of fuel cut;

increasing the amount of exhaust gas or air that flows into the adsorbent as the integrated fuel cut air amount increases;

not changing the amount of exhaust gas or air that flows into the adsorbent when the unburned components desorbed from the adsorbent have not been purified in the exhaust gas purification catalyst; and not allowing the exhaust gas or air to flow into the adsorbent when the temperature of the adsorbent exceeds a temperature threshold, which is a temperature at which the unburned components adsorbed by the adsorbent are desorbed.

10. The exhaust gas purification method according to claim 9, the method further comprising:

driving the internal combustion engine by a rotation force of an electric motor and performing forced fuel cut when the integrated fuel cut air amount is smaller than a first reference value; and performing the forced fuel cut by taking the air amount for a difference between a second reference value and the integrated fuel cut air amount into the combustion chamber.

11. The exhaust gas purification method according to claim 9, wherein the exhaust gas purification device further includes a switching valve that switches a passage of a part or all of exhaust gas or air discharged from the internal combustion engine, from the exhaust passage to the bypass passage; the method further comprising:

setting the switching valve to a full closed state when the internal combustion engine has high load and high rotation, and setting an opening of the switching valve to an opening before the switching valve was set to the full closed state, when the internal combustion engine has low load and low rotation.

* * * * *